US009790078B2

(12) United States Patent
Dickens

(10) Patent No.: US 9,790,078 B2
(45) Date of Patent: Oct. 17, 2017

(54) DISPENSER AND MIXER FOR TWO LIQUIDS SIMULTANEOUSLY

(71) Applicant: Brown-Forman Finland, Ltd., Helsinki (FI)

(72) Inventor: Anthony Thomas Fitzpatrick Dickens, Helsinki (FI)

(73) Assignee: Brown-Forman Finland, Ltd., Helsinki (FI)

( * ) Notice: Subject to any disclaimer, the term of this patent is extended or adjusted under 35 U.S.C. 154(b) by 82 days.

(21) Appl. No.: 15/000,524

(22) Filed: Jan. 19, 2016

(65) Prior Publication Data

US 2017/0203950 A1 Jul. 20, 2017

(51) Int. Cl.
*B67D 7/78* (2010.01)
*B67D 3/00* (2006.01)
*B01F 5/00* (2006.01)
*G01F 11/32* (2006.01)

(52) U.S. Cl.
CPC .......... *B67D 3/0016* (2013.01); *B01F 5/0085* (2013.01); *B67D 3/0045* (2013.01); *B67D 3/0051* (2013.01); *G01F 11/32* (2013.01)

(58) Field of Classification Search
CPC .. B67D 3/0016; B67D 3/0019; B67D 3/0051; B67D 3/0032; B67D 3/0038; B67D 3/0045; B67D 3/0041; B01F 5/0085; G01F 11/32
USPC ..... 222/145.5, 454–457, 426–438, 133–136, 222/448, 424.5, 164–166; 206/219; 99/285, 295, 300, 301
See application file for complete search history.

(56) References Cited

U.S. PATENT DOCUMENTS

| 2,728,490 A * | 12/1955 | Berni | B67D 3/00 |
| | | | 222/153.09 |
| 3,263,872 A * | 8/1966 | Verona | G01F 11/266 |
| | | | 222/416 |
| 3,347,420 A * | 10/1967 | Donoghue | G01F 11/286 |
| | | | 222/129 |
| 4,293,081 A | 10/1981 | Kuckens | |
| 4,310,038 A | 1/1982 | Yule | |
| 4,440,326 A | 4/1984 | Bayly et al. | |
| 4,892,236 A | 1/1990 | Griffiths et al. | |
| 5,601,217 A | 2/1997 | Wagner | |

(Continued)

FOREIGN PATENT DOCUMENTS

| EP | 0252062 A2 | 1/1988 |
| EP | 0252062 B1 | 9/1990 |

(Continued)

OTHER PUBLICATIONS www.amazon.com, "2-in-1 Oil and Vinegar Mister", http://www.amazon.com/Kalorik-2-Oil-Vinegar-Mister/dp/B0093ZZ72E, file saved Jul. 27, 2015, 6 pages.

*Primary Examiner* — Lien Ngo
(74) *Attorney, Agent, or Firm* — Muncy, Geissler, Olds & Lowe, P.C.

(57) ABSTRACT

A dispenser for two liquids such as liquor and flavoring mounted on a bottle of the first liquid. A container of the second liquid is provided in the dispenser. When the bottle is tilted, a predetermined amount of both liquids are measured in separate measuring containers within the dispenser. When a trigger is pulled, the measured amounts of both liquids are released together so as to mix, while the release of both liquids beyond the measured amounts is blocked.

11 Claims, 6 Drawing Sheets

(56) References Cited

U.S. PATENT DOCUMENTS

| | | | |
|---|---|---|---|
| 5,899,245 A | 5/1999 | Wrigley et al. | |
| 6,439,433 B1 | 8/2002 | Dubach et al. | |
| D463,005 S | 9/2002 | Lord | |
| D463,006 S | 9/2002 | Lord | |
| D463,526 S | 9/2002 | Lord | |
| D468,395 S | 1/2003 | Lord | |
| D471,617 S | 3/2003 | Zhao | |
| D471,956 S | 3/2003 | Zhao | |
| 6,616,067 B1 | 9/2003 | Hunter | |
| D484,217 S | 12/2003 | Lord | |
| 7,566,013 B2 * | 7/2009 | MacLean-Blevins | B05B 7/12 239/310 |
| 9,637,272 B2 * | 5/2017 | Albaum | B65D 47/2031 |
| 2005/0205600 A1 | 9/2005 | Ophardt et al. | |
| 2007/0138179 A1 | 6/2007 | Jacobs et al. | |
| 2008/0237270 A1 | 10/2008 | Garvie | |
| 2010/0055252 A1 | 3/2010 | Marina et al. | |
| 2011/0017770 A1 * | 1/2011 | Maas | B67D 1/045 222/1 |
| 2011/0017774 A1 | 1/2011 | Pritchard | |
| 2014/0260997 A1 | 9/2014 | Henderson | |

FOREIGN PATENT DOCUMENTS

| | | |
|---|---|---|
| GB | 2001602 | 2/1979 |
| GB | 2309961 | 8/1997 |
| WO | WO 2006123327 | 11/2006 |
| WO | WO 2014/091248 | 6/2014 |

* cited by examiner

DISPENSER AND MIXER FOR TWO LIQUIDS SIMULTANEOUSLY

BACKGROUND OF THE INVENTION

Field of the Invention

The present invention relates generally to a simultaneous dispenser of two liquids which mix as dispensed and more particularly to a dispenser and mixer of liquor and flavoring simultaneously which is mounted on top of a liquor bottle.

Discussion of the Background

In order to dispense a predetermined amount of liquor from a bottle, it is known to use a dispenser known as an "optic" which is partly clear and screwed or otherwise connected to the top of the liquor bottle. This name is apparently given because the bartender and customer can see that the dispenser is full and thus, that the proper amount of liquor (such as a shot) is being dispensed. It is only necessary to tip the bottle until the internal container is filled and a trigger is pulled to dispense the measured amount of liquor into a glass. Such devices are seen in WO Publication 2006/123327 and U.S. Pat. No. 5,601,217.

However, customers now are interested in purchasing liquor which has an additional flavoring added. Flavored vodka, especially, has generated a lot of interest from customers. However, there has been no simple way to add flavoring to unflavored vodka as it is dispensed. It is possible to prepare or buy an entire bottle of flavored vodka, but this requires a number of separate bottles for different flavors. This requires a large amount of space and expense for a commercial bar and is especially not practical for a home bar.

Dispensers are also known for simultaneously dispensing two liquids, such as US Publication 2005/0205600 and U.S. Pat. No. 5,899,245. However, these are not designed to be used on top of a liquor bottle and the second does not mix the two liquids being dispensed.

SUMMARY OF THE INVENTION

The present invention has two measuring containers, one for the liquor and one for the flavoring, within a housing that is screwed onto the top of a liquor bottle.

The present invention dispenses and mixes the two liquids simultaneously.

The present invention includes an optic measuring system on top of a liquor bottle and a container of flavoring. The optic allows visual reading of both the liquor and the flavoring.

The present invention provides a housing which is mounted on a liquor bottle and includes a container of flavoring and which dispenses and mixes the liquor and flavoring simultaneously.

The present invention achieves the above by providing a housing of the optic type which is screwed onto a liquor bottle. The housing also receives a container of flavoring to be mixed with the liquor. Two measuring containers, one for the liquor and one for the flavoring, are included in the housing and are filled by tilting the bottle. By pulling a trigger, the measured liquor and flavoring are dispensed simultaneously while being mixed and at the same time further release of the liquor and flavoring is prevented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
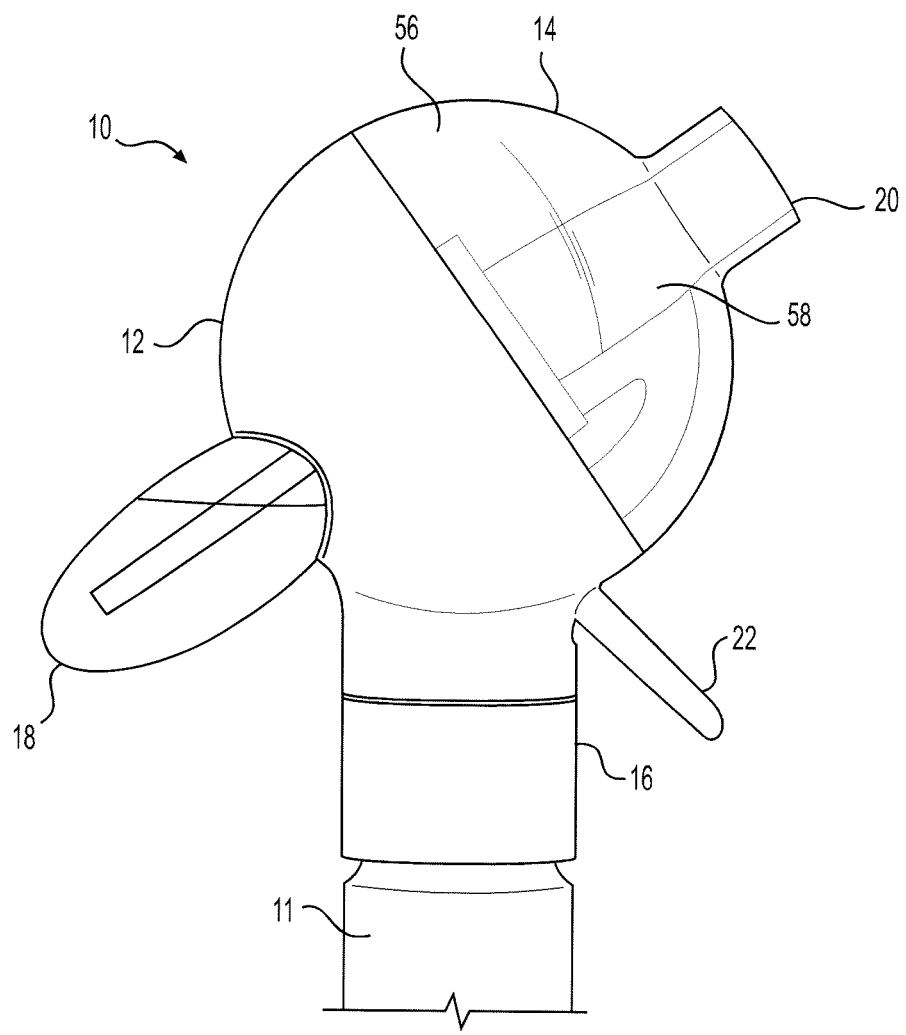
FIG. 1 is a side view of the present invention.

Referring now to the drawings, wherein like numerals designate identical or corresponding parts throughout the several views, and more particularly to FIG. 1 thereof, wherein the dispenser 10 is shown in a side view. The housing of the dispenser is formed in two parts, the housing back 12 and the housing front 14. The housing back includes a neck 16 which is connected to a bottle 11 containing a first liquid, such as vodka or other liquor. The housing front 14 is shown as being clear so that the liquids can be seen while being measured. The first and second measuring containers 56 and 58 can be seen through the clear part of the housing to visually confirm that a proper measurement has been taken. It is possible for the back 12 to also be clear. The housing may be made in more than two pieces or in a single piece.

The second liquid is contained in container 18, which is received in a hole in the housing back 12. The position of the container 18 may be varied, as long as its mounting allows the liquid to flow when the bottle is tilted. The shape of the container may also be varied. Container 18 is removable, so that a different flavoring may be inserted when desired. In this manner, the bartender may have a variety of flavoring containers which may be interchanged with the dispenser as desired. Since the flavoring containers are much smaller than the liquor bottle, it is possible to provide a number of different flavored liquors in a relatively small space.

Figure 6:
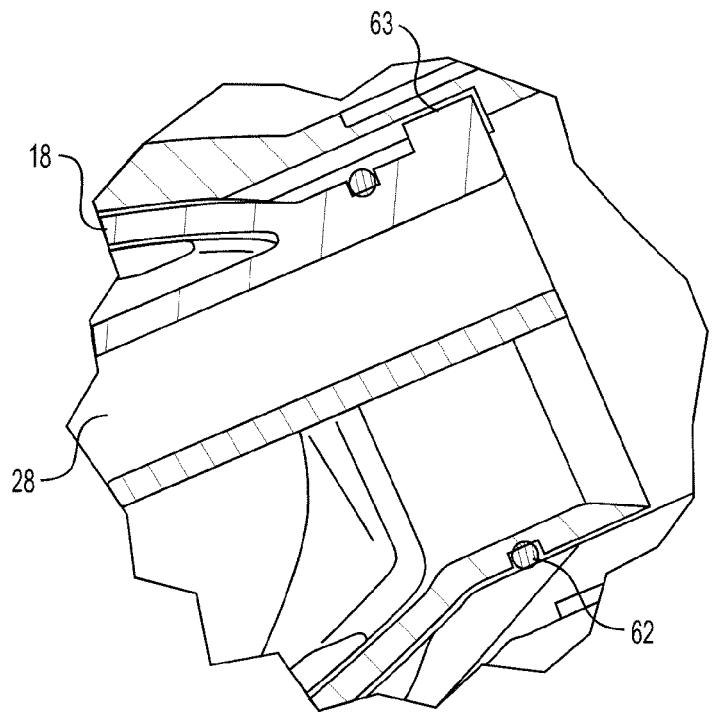
FIG. 6 is a close up view of the flavoring container of FIGS. 2 and 3 and its mounting.

FIG. 6 shows the manner of mounting the container 18 on the housing. A groove 63 is formed in the opening for the container in the housing. Likewise a flange on the end of the container 18 extends into the groove to hold the container in position. An 0-ring 62 prevents leakage and creates friction that helps to hold the container in position. The container can be inserted into the housing by pushing so that the flange is forced inwardly slightly until the groove is reached. The container can be removed by pulling hard enough to slightly deform the flange so that it leaves the groove and is easily removed.

Figure 4:
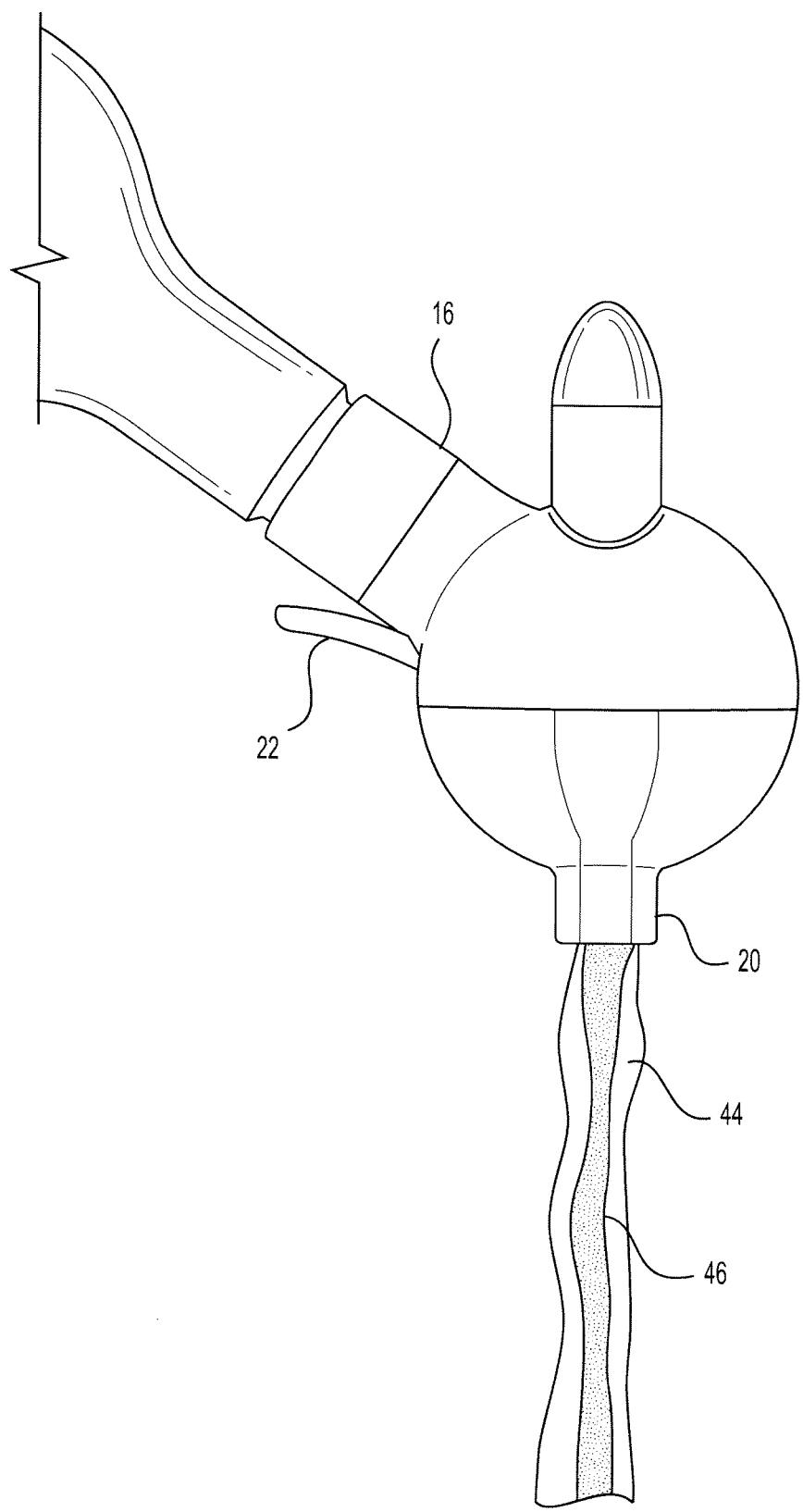
FIG. 4 is a side view of the present invention with the bottle being tilted and the liquids being dispensed.

A nozzle 20 is provided at the front of the dispenser as part of the housing front 14. Both liquids are dispensed from the nozzle at the same time and in close proximity, causing mixing when the bottle is tilted and the trigger pulled. As seen in FIG. 4, the nozzle 20 dispenses first liquid 44 at the same time as second liquid 46. The two liquids form streams that are in contact and mix as they flow from the nozzle. The mixing is completed when the dispensed liquids reach the glass or other container into which the drink is being poured.

Figure 2:
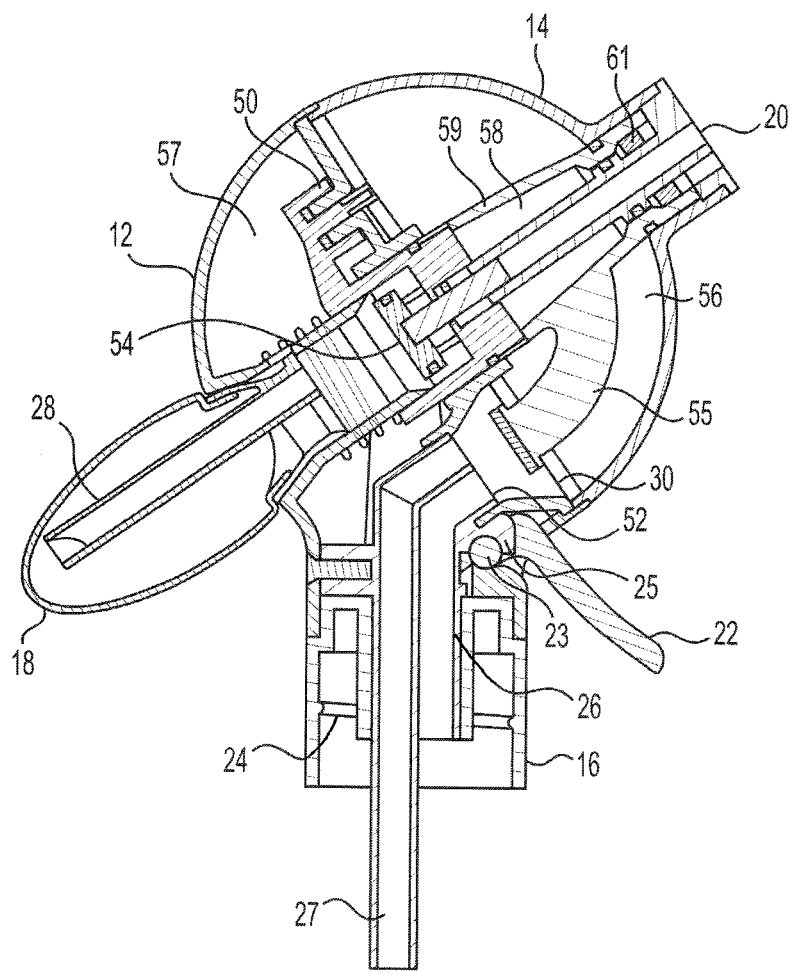
FIG. 2 is a cross sectional view of the present invention, while the measuring containers are being filled.

FIG. 2 is a cross sectional view of the dispenser. The neck 16 has on its inside surface a screw thread 24, which matches with a standard screw thread on a liquor bottle. When the dispenser is turned, the dispenser is tightly mounted to the bottle to prevent leaking. It would also be possible to use a cork or other arrangement to mount the dispenser to the bottle.

The neck also contains a first channel 26 for carrying the first liquid from the bottle to a first measuring container 56 in the dispenser. Air is carried by channel 27 into the bottle from the first measuring chamber as the first liquid flows into the first measuring container. The flavoring container 18 includes a second channel 28 for carrying air from the second measuring container 58 into the container 18 as the flavoring flows into a second measuring container in the dispenser through seal 54.

A middle wall 30 extends across the housing and is fixed in place. The edges of the middle wall are shown to match the junction between the front and back of the housing. The middle wall may form part of the joint between the front and back or may be joined to the housing separately. The middle wall could be connected to the housing in a different location than the front/back junction if desired. The middle wall is connected to the non-movable parts of the seals.

Figure 5:
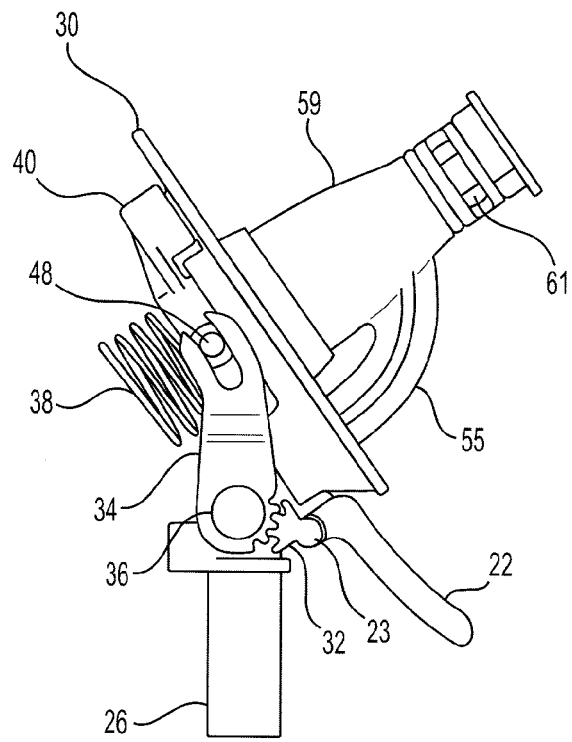
FIG. 5 is a side view of the present invention without the housing.
Figure 7:
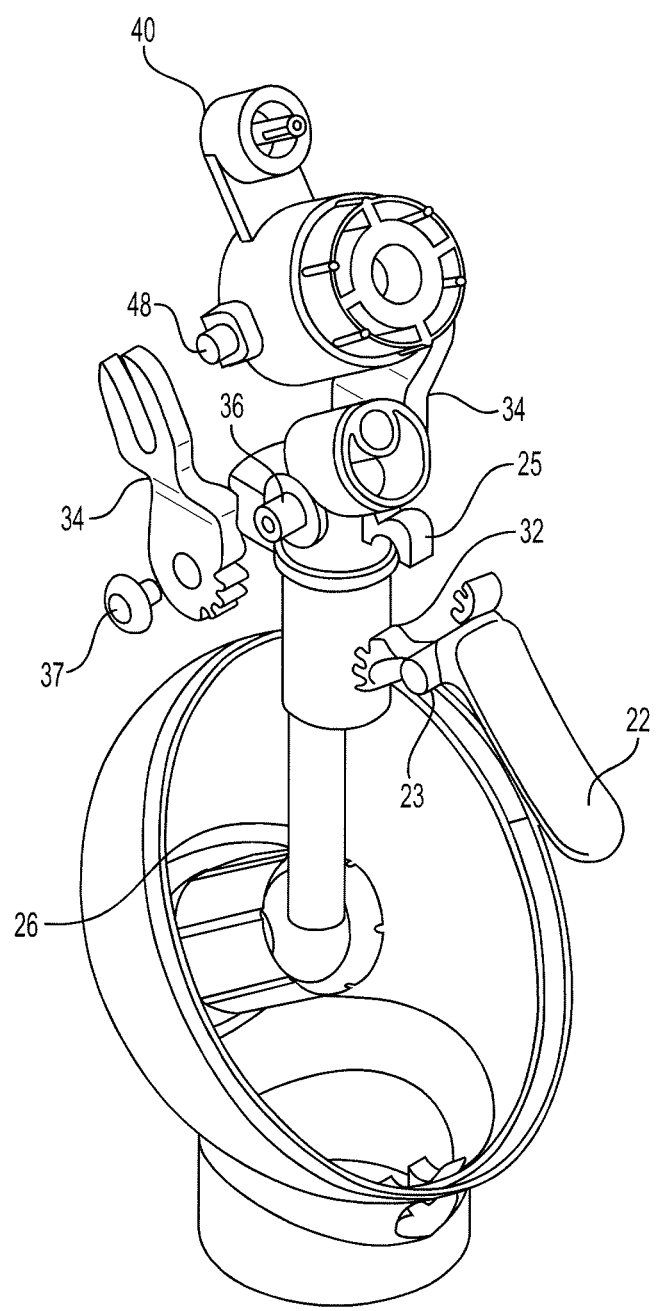
FIG. 7 is an exploded view of the dispensing mechanism of FIGS. 2 and 3.

As seen in FIGS. 5 and 7, the trigger 22 has an upper end in the form of gear teeth 32. The trigger moves about a pivot 23 mounted on the housing, so that when the trigger is pulled, the gear teeth move in a circular path. Hook 25 of the channel 26 holds the pivots in position. The lower end of the trigger is outside the housing for easy access, but the upper end is within the housing.

Two arms 34 are on either side of the channel 26. The aims are mounted on a pivot 36, which is mounted on the channel 26, for rotation. Pin 37 holds the arms on the pivots. The lower end of the aims has gear teeth that match with the gear teeth of the trigger. When the trigger is pulled, the gear teeth of the trigger rotate and cause the gear teeth of the anus to also rotate. The arms then rotate to the left in FIG. 5. The upper end of the arms has a fork that contacts a pair of prongs 48 (only one is shown) on the stopper 40.

When the arms rotate, the forks move the prongs in a direction away from the middle wall, causing the stopper 40 to also move away from the middle wall. Wall 59 which separates the two measuring containers also moves with the stopper. A spring 38 is fixedly mounted on the housing back 12 and extends against the stopper 40. The spring forces the stopper against the middle wall until the trigger is pulled. Pulling the trigger causes the stopper to move away from the middle wall against the force of the spring, which causes various seals to open or close.

Before the trigger is pulled, as shown in FIG. 2, the seal at 50 is closed, the seal at 52 is open and the seal at 54 is open. If the bottle is tilted, the first liquid from the bottle flows through seal 52 into the first measuring container 56. At the same time, the second liquid flows from the container 18 through seal 54 into the second measuring container 58. These liquids are replaced by air that moves through channels 27 and 28.

Figure 3:
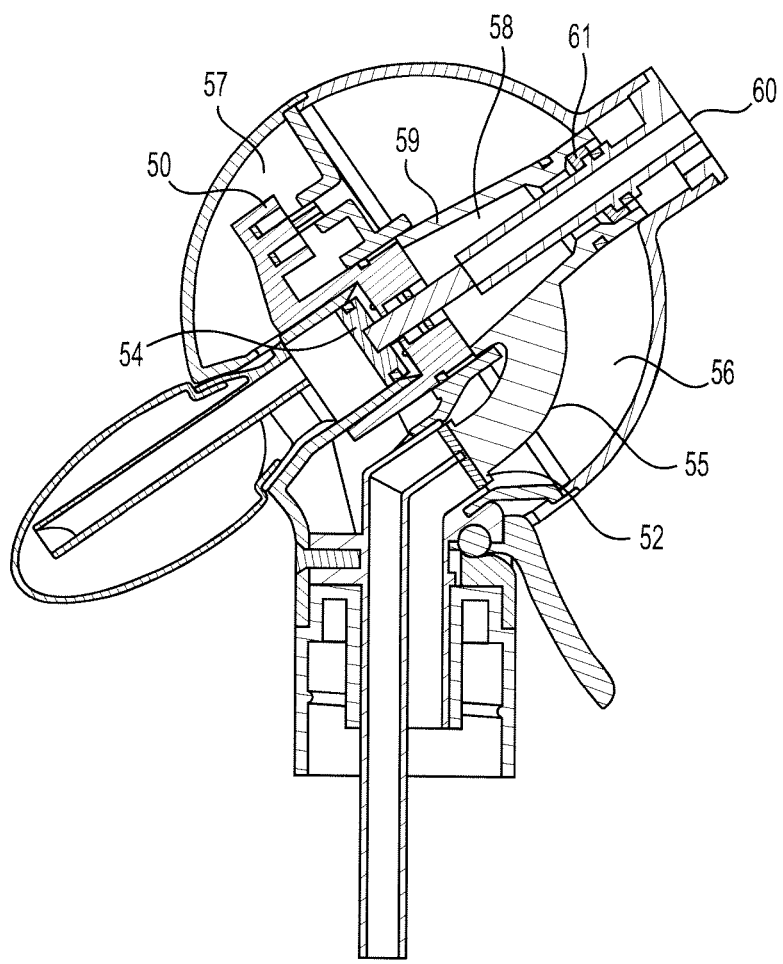
FIG. 3 is a cross sectional view of the present invention after the trigger is pulled.

However, after the trigger is pulled, as shown in FIG. 3, seal 50 is opened by the movement of the stopper to allow air to flow in channel 60 into measuring container 58. Also, air is exchanged between the volume 57 on the other side of the middle wall from the measuring containers and measuring container 56. Seals 52 and 54 are closed at the same time by the movement of an extension 55 of the wall 59 and the stopper 40, respectively to prevent any additional liquids from reaching the measuring containers, thus assuring that the amount dispensed is exactly equal to the amount in the measuring containers.

As seen in FIGS. 2 and 3, when wall 59 moves inwardly, the openings 61 are in communication with the first measuring container 56, allowing the first liquid to flow into the nozzle. At the same time, a channel is opened between the wall 59 and the channel 60 allowing the second liquid to flow from the second measuring container 58 into the nozzle. The liquids start to mix as they enter the nozzle and continue to mix as they flow out of the nozzle.

The relative volumes of the two liquids may be determined according to the sizes of the measuring containers. For example, for a standard American shot which is equal to 45 ml, the dispensed amount can be 40 ml of vodka and 5 ml of flavoring. The measuring containers are then sized to this volume. If a different volume is desired, it is necessary to manufacture the measuring containers with different volumes. The flavoring container 18 can contain enough flavoring for a number of drinks, such as 25 ml for 5 drinks. Other sizes of containers can be used as desired. Since a number of different flavors may be desired, it would make the total cost for flavorings to be less if smaller volumes of individual containers are utilized.

Although the present invention has been described in terms of vodka, other liquors, such as whiskey, gin, tequila, rum, etc. can be used as the first liquid. Further, the dispenser may find use in other situations where two liquids are dispensed together. Thus, flavorings can be added to other potable liquids, such as non-alcoholic beverages, medicines, etc. It may also be used for dispensing non-potable liquids which need to be measured and mixed.

Numerous additional modifications and variations of the present invention are possible in light of the above teachings. It is therefore to be understood that within the scope of the appended claims, the invention may be practiced otherwise than as specifically described herein.

The invention claimed is:

1. A dispenser for two liquids, comprising:
   a housing;
   a first measuring container within said housing, adapted to be connected to a supply of first liquid, for measuring a predetermined volume of the first liquid;
   a container of second liquid mounted on said housing;
   a second measuring container connected to said container of second liquid for measuring a predetermined volume of the second liquid;
   a stopper connected to said first and said second measuring containers, having two operative positions, the first operative position allowing said first and second liquids to fill said first and second measuring containers, respectively, and the second operative position allowing said first and second measuring containers to dispense the measured first and second liquids and to prevent inflow of further first and second liquids;
   a trigger connected to said stopper, which when actuated causes said stopper to move from the first operative position to the second operative position.

2. A dispenser according to claim 1, further comprising:
   a neck portion connected to said housing adapted for mounting on a container of a first liquid including said supply of first liquid.

3. A dispenser according to claim 2, wherein said neck portion includes screw threads matching screw threads on said container of first liquid.

4. A dispenser according to claim 2, wherein said neck portion includes a first channel connected to said first measuring container for supplying said first liquid to said first measuring container.

5. A dispenser according to claim 1, further comprising a second channel connected between said container of said second liquid and said second measuring container.

6. A dispenser according to claim 1, wherein said housing includes at least two portions and at least one of the portions is transparent.

7. A dispenser according to claim 1, further comprising:
   a middle wall fixedly extending across an inside of the housing, said middle wall providing seals for said stopper.

8. A dispenser according to claim 7, further comprising:
   a spring fixedly connected to said housing and providing a force against said stopper to urge the stopper against the seals in the middle wall.

9. A dispenser according to claim 7, wherein said first measuring container is defined by said middle wall and the inside of the housing.

10. A dispenser according to claim 9, wherein said second measuring container is contained within said first measuring container.

11. A dispenser according to claim 1, further comprising:
    a nozzle connected to said housing for receiving the first and second liquids from the first and second measuring containers and dispensing and mixing the first and second liquids from the dispenser.

\* \* \* \* \*